Nov. 7, 1961    V. KORDENBROCK    3,007,401
VEHICLE TIRE PAINT SHIELD
Filed Oct. 8, 1959
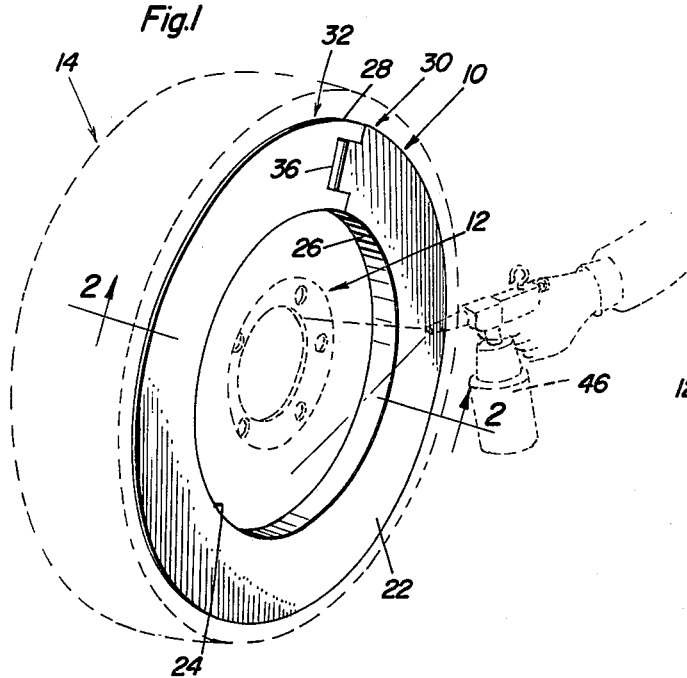
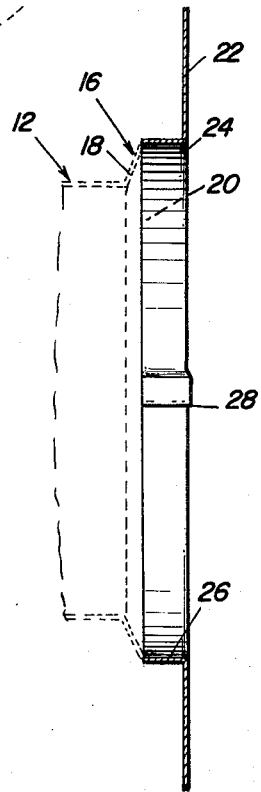
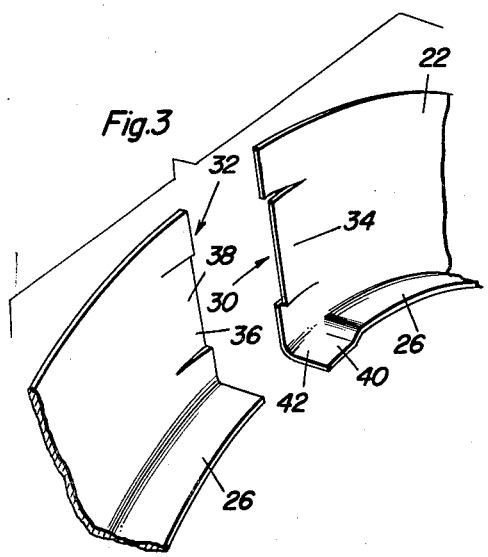
Val Kordenbrock
INVENTOR.
BY *Clarence A. O'Brien*
and *Harvey B. Jacobson*
Attorneys United States Patent Office 3,007,401
Patented Nov. 7, 1961

3,007,401
VEHICLE TIRE PAINT SHIELD
Val Kordenbrock, 2200 Compton Road, Cincinnati, Ohio
Filed Oct. 8, 1959, Ser. No. 845,199
4 Claims. (Cl. 101—127)

This invention relates to a novel and useful vehicle tire paint shield and more particularly relates to a shield which is adapted to be removably secured to the rim of a tire so as to shield the side wall of the tire during the process of painting the wheel.

This invention utilizes a disk-like member having a central opening therein defining an annulus which is of such dimensions so as to form a shield which may be positioned in overlying relation to the side wall of a tire to protect the latter during the process of painting the wheel rim on which the tire is mounted.

With the cost of present-day new automobiles increasing constantly, many vehicle owners, rather than spending a great deal of money to purchase a new automobile and having to realize large depreciation of their investment for the first several years of ownership, attempt to maintain their vehicles in good mechanical order and also looking as new as is possible. Of course, the best way of restoring the appearance of an automobile to its approximate new car appearance is to have the vehicle painted. Thus, there has been a great increase in the number of shops that specialize in the painting of motor vehicles.

Paint shop owners have a definite problem in storing vehicles both before they are painted and also after they are painted until they have had a chance to thoroughly dry. It can therefore be easily understood that the time factor in taking an automobile and getting it ready for the customer after it has been painted is a factor which must be given considerable attention.

A vehicle owner usually wants the wheels painted as well as the body especially if, after having a vehicle of one color for a number of years, he desires to have the color of the vehicle changed. Of course the wheels are usually painted to match the body of the vehicle.

When painting the wheels of a vehicle it is most desirable to have a convenient means for masking the side walls of the tires so that painting a wheel on the automobile will not result in paint falling and adhering to the side wall of a tire. In the past masking tape and paper have been used but it is extremely difficult to mask paper to a tire so that spray from a paint gun will not slip under a crack or wrinkle and adhere to the side wall of the tire. If paint is allowed to adhere to the side wall of a tire considerable time must be spent, which usually involves removing the tire from the rim, to have it cleaned with a good cleaner or steam both of which could not be used near a freshly painted rim on which the paint was still soft.

It is the main object of this invention to provide a vehicle tire paint shield that may be quickly applied and removably secured in position upon the wheel in such a manner whereby spray from the paint gun will not be allowed to come in direct contact with the side walls of a tire.

A further object of this invention, in accordance with the preceding object, is to provide a vehicle tire paint shield that may be readily applied to vehicle wheels of different dimensions.

A still further object of this invention is to provide a vehicle tire paint shield that may be removably secured to the wheel of a vehicle without the use of special tools or fasteners.

A final object to be specifically enumerated herein is to provide a vehicle tire paint shield that will conform to conventional forms of manufacture, be of simple construction and easy to apply so as to provide a device that will be economically feasible, long lasting and operable by relatively unskilled labor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention shown mounted upon a conventional form of vehicle wheel, the wheel and paint spraying gun being shown in phantom lines;

FIGURE 2 is an enlarged sectional view taken substantially upon the plane indicated by the section line 2—2 of FIGURE 1; and FIGURE 3 is an enlarged exploded detailed view of those portions of the paint shield adjacent the radially extending split therein, parts of the shield being broken away and shown in section.

With attention now directed more particularly to FIGURE 1 of the drawings there will be seen the paint shield comprising the present invention generally designated by the reference numeral 10 which is shown mounted upon a conventional form of vehicle wheel 12 having a tire generally designated by the reference numeral 14 mounted thereon.

The wheel 12 is provided with a rim portion generally designated by the reference numeral 16 which has the usual radially extending flange 18 thereon terminating in an axially extending flange 20. The flange 18 cooperates with the main body portion of the wheel 12 to form a seat in which the bead of the tire is seated. The outwardly turned or axially extending flange 20 forms a cushioning surface for the tire 14 should the vehicle on which the wheel 12 is mounted hit a hole in the road compressing the portion of a tire 14 which is in contact with the ground toward the rim portion 18 of the wheel 12.

The flange 20 normally extends slightly outward away from the side wall of the tire 14 and provides a cylindrical surface with which shield 10 is frictionally engaged when the latter is in position overlying the side wall of the tire 14.

The paint shield 10 comprises a split disk-like member 22 having a central opening 24 therein. Formed integrally with a periphery of the opening 24 is an axially extending flange 26 which is split as at 28.

The disk 22 is provided with end portions generally designated by the reference numerals 30 and 32 which may be interlockingly engaged with each other. The end portion 30 is provided with a laterally offset tongue portion 34 which is receivable in a depression 36 formed by an oppositely laterally struck portion 38. In addition the end of the flanged 26 adjacent end portion 30 is provided with a laterally offset portion forming a recess 42 which is adapted to receive the corresponding opposite end of the flange 26 when the two end portions 30 and 32 are interlockingly engaged. In this manner, the two end portions 30 and 32 may be interlockingly engaged in such a manner whereby cracks or openings through which spray from a paint spray gun might pass are not present. This is extremely important in as much as a line of paint on a white or black walled tire is very easily observed and difficult to remove.

It is to be understood that the paint shield 10 is to be constructed of suitable sheet material, such as metal, plastic or other similar materials which would enable the paint shield 10 to resiliently and frictionally engage the rim 18 of a wheel 12. It is further to be understood that the end portions 30 and 32 of the shield 10 are normally urged together by the natural resiliency of the material of which the rim 10 is constructed and also that the component parts of the end portions 30 and 32 are of sufficient length so as to overlap the sufficient distance to enable the shield 10 to be circumferentially expanded so that it may be conveniently used for the intended purpose on rims of varying diameters.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle tire paint shield comprising a split disk-like member having a central opening therein, said member being adapted to overlie the side wall of a tire, an axially projecting peripheral flange formed on said disk about said opening adapted to embrace the outer periphery of a tire rim to retain said disk-like members in position overlying the side wall of a tire mounted on said rim, said disk-like member being constructed of a resilient material, said member having its confronting ends normally biased together, said ends each having end portions interlockingly engageable with the other end portion upon relative endwise sliding movement of said end portions in a manner whereby cracks or openings through which spray from a paint spray gun might readily pass are omitted, one of said interlocking end portions including a laterally offset tongue portion struck outwardly from one side of said disk, the other end portion including a laterally offset depressed portion struck outwardly from the other side of said disk in which said tongue is receivable.

2. The combination of claim 1 including a circumferentially extending laterally offset end portion on one end of said flange adapted to overlie the other end of said flange.

3. The combination of claim 1 wherein each of said interlocking end portions are of sufficient length to lap over the opposite corresponding end portion a sufficient amount to enable the disk-like member to be circumferentially expanded to cover tires applied to rims of varying sizes.

4. The combination of claim 1 wherein said tongue and depressed portions are struck laterally from corresponding intermediate portions of the corresponding ends of said disk spaced from both the inner and outer peripheral edges of said disk, the areas of each of said ends not struck laterally therefrom and disposed on both sides of said tongue and depressed portions overlapping the corresponding areas of the other end of said disk in a manner opposite to the overlapping of said tongue and depressed portions.

References Cited in the file of this patent

UNITED STATES PATENTS

| | | |
|---|---|---|
| 2,634,704 | Morrison | Apr. 14, 1953 |
| 2,716,391 | Nonemaker et al. | Aug. 30, 1955 |
| 2,835,222 | Hall | May 20, 1958 |